United States Patent
Bauer et al.

(10) Patent No.: US 9,404,408 B2
(45) Date of Patent: Aug. 2, 2016

(54) DEVICE AND METHOD FOR METERING A REDUCING AGENT INTO AN EXHAUST GAS SYSTEM OF A MOTOR VEHICLE

(75) Inventors: Peter Bauer, Immenreuth (DE); Rainer Bentz, St. Wendel (DE); Hermann Ketterl, Stephansposching (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 264 days.

(21) Appl. No.: 12/855,779

(22) Filed: Aug. 13, 2010

(65) Prior Publication Data
US 2011/0047972 A1    Mar. 3, 2011

(30) Foreign Application Priority Data

Aug. 14, 2009  (DE) .................. 10 2009 037 564

(51) Int. Cl.
*F01N 3/029* (2006.01)
*F01N 3/20* (2006.01)
(Continued)

(52) U.S. Cl.
CPC ............ *F01N 3/2066* (2013.01); *B01D 53/90* (2013.01); *B01D 53/9409* (2013.01); *B01D 2251/2062* (2013.01); *B01D 2251/2067* (2013.01); *F01N 2610/02* (2013.01); *F01N 2610/14* (2013.01); *F01N 2610/1473* (2013.01); *Y02T 10/24* (2013.01)

(58) Field of Classification Search
CPC ............ B01D 53/90; B01D 53/94909; B01D 2251/2062; B01D 2251/2067; F01N 3/2066; F01N 2610/02; F01N 2610/1473
USPC .............. 60/274, 286, 295, 301, 303; 222/63, 222/318
See application file for complete search history.

(56) References Cited

U.S. PATENT DOCUMENTS

| | | | | |
|---|---|---|---|---|
| 3,203,227 A | * | 8/1965 | Donnell | ............ 374/27 |
| 5,289,810 A | * | 3/1994 | Bauer et al. | ............ 123/510 |

(Continued)

FOREIGN PATENT DOCUMENTS

| | | | |
|---|---|---|---|
| CN | 101091040 A | 12/2007 | ........ F01N 3/20 |
| CN | 101103185 A | 1/2008 | ........ B01D 53/90 |

(Continued)

OTHER PUBLICATIONS

Machin Translation of EP 1656986 A1.*

(Continued)

*Primary Examiner* — Kenneth Bomberg
*Assistant Examiner* — Brandon Lee
(74) *Attorney, Agent, or Firm* — Slayden Grubert Beard PLLC

(57) ABSTRACT

In an internal-combustion engine exhaust gas system, a storage tank stores the reducing agent, a supply pipe connects the storage tank to a metering unit which introduces the reducing agent into the exhaust gas system. A pump mechanism within the supply pipe conveys the reducing agent. A pressure sensor detects the pressure in the supply pipe downstream of the pump, and a pressure-releasing device has a return pipe connected to the storage tank and comes off the supply pipe. A first valve system is arranged in the supply pipe. A section of the return pipe is located at a higher level than the return pipe to form a storage volume for air present in the supply pipe. A second valve system is arranged in the supply pipe to create, when the second valve system is closed, a storage volume for pressurized reducing agent by way of this pipe branch.

10 Claims, 1 Drawing Sheet

(51) Int. Cl.
   *B01D 53/90*   (2006.01)
   *B01D 53/94*   (2006.01)

(56) References Cited

U.S. PATENT DOCUMENTS

| | | | | |
|---|---|---|---|---|
| 5,697,393 | A * | 12/1997 | Mirlisena, Sr. | 137/15.02 |
| 6,577,089 | B1 * | 6/2003 | Piedl et al. | 318/432 |
| 7,775,036 | B2 | 8/2010 | Barcin | 60/286 |
| 7,836,684 | B2 * | 11/2010 | Starck | B01D 53/9431 |
| | | | | 60/286 |
| 7,886,525 | B2 * | 2/2011 | Nishibu et al. | 60/286 |
| 7,937,932 | B2 * | 5/2011 | Hager et al. | 60/286 |
| 8,091,575 | B2 * | 1/2012 | Gammon | 137/88 |
| 8,646,475 | B2 | 2/2014 | Jochumsen et al. | 137/98 |
| 8,671,663 | B2 | 3/2014 | Buerglin et al. | 60/286 |

| | | | | |
|---|---|---|---|---|
| 2001/0023585 | A1 * | 9/2001 | Dolling et al. | 60/286 |
| 2008/0022658 | A1 * | 1/2008 | Viola et al. | 60/286 |
| 2008/0282681 | A1 * | 11/2008 | Katou et al. | 60/286 |

FOREIGN PATENT DOCUMENTS

| | | | | |
|---|---|---|---|---|
| CN | 101405489 A | | 4/2009 | F01N 3/20 |
| DE | 19947197 A1 * | | 4/2001 | |
| DE | WO 2006000477 A1 * | | 1/2006 | |
| DE | WO 2006131201 A2 * | | 12/2006 | |
| EP | 1656986 A1 * | | 5/2006 | |

OTHER PUBLICATIONS

Machine Translation of DE 19947197 A1.*
Chinese Office Action, Application No. 201010254293.8, 13 pages, Jan. 13, 2014.

* cited by examiner

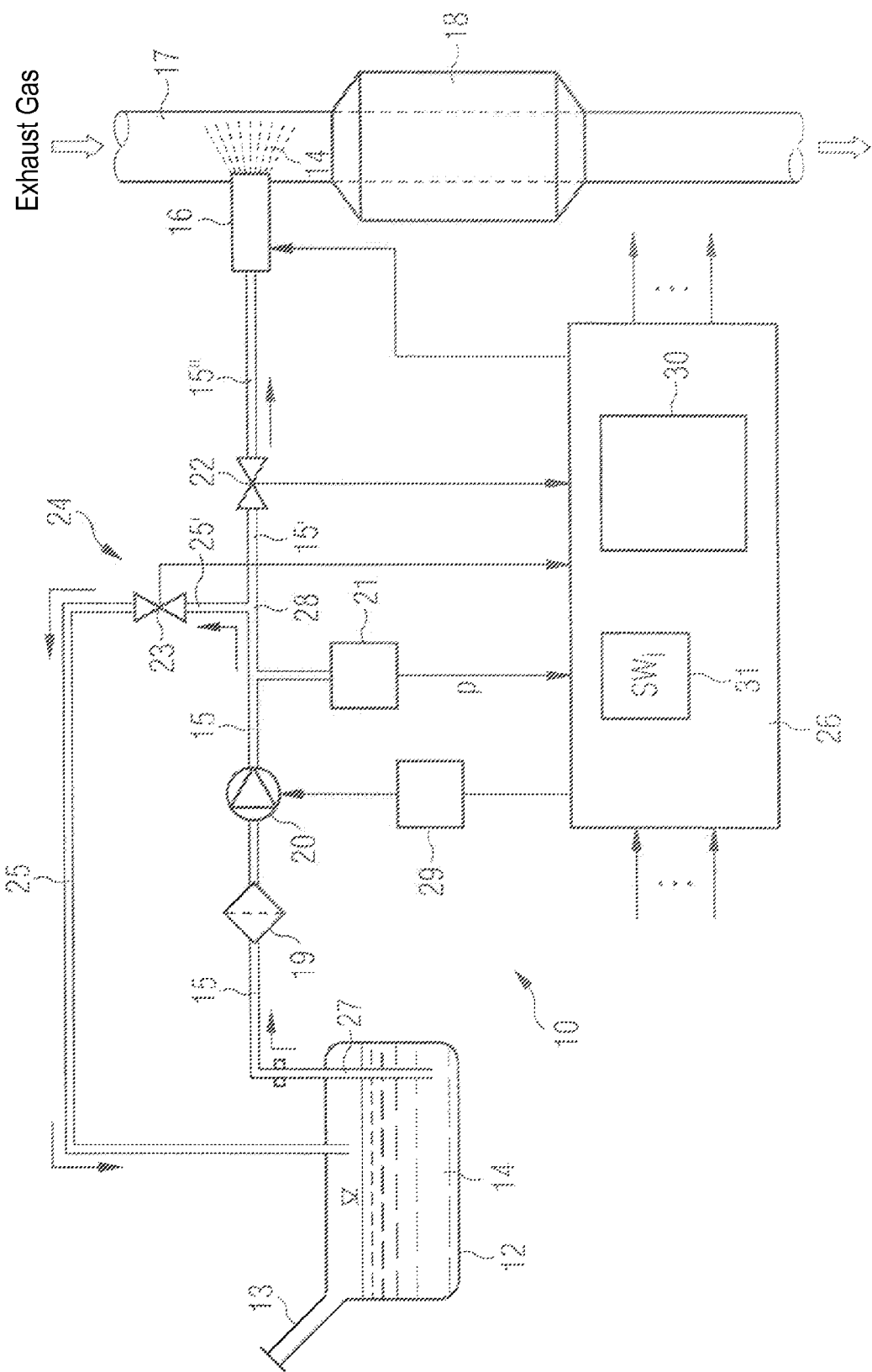

DEVICE AND METHOD FOR METERING A REDUCING AGENT INTO AN EXHAUST GAS SYSTEM OF A MOTOR VEHICLE

CROSS-REFERENCE TO RELATED APPLICATIONS

This application claims priority to DE Patent Application No. 10 2009 037 564.3 filed Aug. 14, 2009, the contents of which is incorporated herein by reference in its entirety.

TECHNICAL FIELD

The invention relates to a device and method for metering a reducing agent, such as an aqueous urea solution, into an exhaust gas system of an internal-combustion engine.

BACKGROUND

During operation of internal-combustion engines (hereinafter simply called internal-combustion engines,) exhaust gas is produced which contains pollutants, such as HC, CO, $NO_x$, etc. Legal rules exist for various pollutants, such as HC, CO, $NO_x$ and particles, which fix pollutant limit values. To meet these legal requirements it is usually necessary to purify the exhaust gas that accumulates. An exhaust gas purification system is conventionally used for this purpose. Specific $NO_x$-reducing methods based on $NO_x$ storage catalytic converters or SCR catalytic converters are increasingly being used in the case of lean internal-combustion engines, such as diesel engines and petrol lean-mix engines. SCR catalytic converters require a reducing agent for $NO_x$ reduction. Ammonia (NH3) is the reducing agent that is currently conventional. This reducing agent is currently produced by injecting a urea-water solution and hydrolyzing this in the exhaust gas system of the internal-combustion engine or "on board" the respective vehicle, and this is then supplied to the SCR catalytic converter. Provision of the reducing agent presents challenges with respect to robustness, reliability and cost-effectiveness, however. The current arrangements known from the prior art use a diaphragm pump for conveying, i.e. for transporting the reducing agent from a storage tank to the site of conversion into ammonia, the pump being suitable for the urea-water solution medium. The arrangements that are based on a backflow system have a very complex and expensive 4/2-way valve. This valve achieves pumping-out without having to reverse the pump direction. Furthermore, these arrangements require a valve to scour the pipes, and regulation of the temperature in the pipe system. Reducing agent is pumped back, moreover, i.e. counter to the feed direction during normal operation. This can take place on the one hand by using fresh air and on the other hand by way of exhaust gas through the open injector. However the latter has the drawback of the injector potentially becoming blocked up. The process of injecting the reducing agent via an injector into a generator or directly into the exhaust gas system belongs to the prior art.

A urea metering device is known from EP 1 656 986 A1. The urea metering device comprises a storage tank for the reducing agent. This is connected by a first pipe to a 2/2-way valve which introduces the reducing agent into the exhaust gas system. A pump, followed by a filter, is arranged between the storage tank and the metering valve. The pump pumps the reducing agent to the exhaust gas system, the reducing agent being metered into the exhaust gas system via actuation of the metering valve. The pump is designed in such a way that it can also convey the reducing agent from the metering valve back into the storage tank. It is therefore possible to pump reducing agent in the first pipe back into the storage tank and to completely empty the first pipe. A second pipe is also provided which can be switched via a 2/2-way valve. If during operation of the pump excess reducing agent is conveyed via the first pipe to the valve and excessive pressure is produced as a result, the valve in the second pipe is opened to reduce the pressure and a reducing agent overflow can flow back into the storage tank via the second pipe.

A metering systems is also known from DE 10 2004 054 238 A1. The metering system comprises a storage tank having a urea solution as reducing agent. The storage tank is connected by a pipe to a pump, various filters and a metering valve via which the reducing agent is metered into a metering point of an exhaust gas inlet region of a catalytic converter. A region of the feed pipe between the feed pump and the metering valve can also be emptied in the direction opposite to the feed direction during normal operation. The feed direction of the feed pump is reversed in this case and the urea solution conveyed back into the storage tank counter to the conventional feed direction during normal operation. A ventilation valve arranged upstream of the metering valve is opened and the metering valve closed.

Systems are also known from the prior art which are based on a dead headed system (no return, admission only). Such systems can be destroyed in the event of certain external conditions, such as frost, however if they do not have sufficient measures available, such as pressure-reduction or expansion possibilities for the reducing agent. Furthermore, it is not possible to reduce the pressure in the pressure pipe as desired with a diaphragm pump.

A device for metering a reducing agent by means of a metering valve system into an exhaust gas system of a motor vehicle is known from DE 199 47 197 A1. A storage tank is provided which contains the reducing agent. The storage tank is connected by a first pipe to a metering valve system. A filter element, followed by a pump mechanism, is provided in the first pipe. A pressure-reducing device is connected to the first pipe to reduce pressure from the first pipe.

A method and a device for metering a reducing agent to remove nitrogen oxides from the exhaust gas are known from DE 100 47 516 A1. The reducing agent is located in a storage tank and is conveyed via a pipe and with the aid of a pump to a metering device. A return pipe, in which a check valve is arranged, is provided parallel to the pump.

SUMMARY

According to various embodiments, a device and a method for metering a reducing agent into an exhaust gas system of an internal-combustion engine can be provided which allow safe and reliable operation of the exhaust gas after-treatment system.

According to various embodiments, a metering device for introducing a reducing agent into an exhaust gas system of an internal-combustion engine, may comprise a storage tank for storing the reducing agent, a supply pipe which connects the storage tank to a metering unit associated with the exhaust gas system, the unit introducing the reducing agent into the exhaust gas system, a pump mechanism used in the supply pipe for conveying the reducing agent, a pressure sensor device for detecting the pressure in the supply pipe downstream of the pump mechanism, a pressure-releasing device which comprises a return pipe connected to the storage tank and coming off at a branch of the supply pipe downstream of the pump mechanism, and a first valve system arranged in the return pipe, wherein a section of the return pipe located between branch and entry of the first valve system is located at a higher level than the supply pipe, so a storage volume is formed for air present in the supply pipe, and a second valve system is arranged in the supply pipe downstream of the branch, the section of the supply pipe which is located between branch and entry of the second valve system being shorter than the section of the supply pipe between the exit of the second valve system and the metering device.

According to a further embodiment, the reducing agent can be a urea solution or an ammonia solution. According to a further embodiment, the valve systems may comprise electrically controllable valves. According to a further embodiment, the pump mechanism can be designed as a diaphragm pump. According to a further embodiment, a filter element for filtering the reducing agent can be arranged in the supply pipe.

According to an embodiment, a method for introducing a reducing agent by means of a metering device into an exhaust gas system of an internal-combustion engine with a storage tank for storing the reducing agent, a supply pipe which connects the storage tank to a metering unit associated with the exhaust gas system, the unit introducing the reducing agent into the exhaust gas system, a pump mechanism used in the supply pipe for conveying the reducing agent, a pressure sensor device for detecting the pressure in the supply pipe downstream of the pump mechanism, a pressure-releasing device which has a return pipe connected to the storage tank and coming off at a branch of the supply pipe downstream of the pump mechanism, and a first valve system arranged in the return pipe, the method may comprise: during operation of the metering device when the valve of the first valve system is closed, comparing the values of the pressure detected by the pressure sensor device continually with a predefined threshold value, if the threshold value is fallen below, closing a valve of a second valve assembly arranged in the supply pipe downstream of the branch, so air present in the supply pipe upstream of the second valve system collects in a section of the return pipe serving as a storage volume.

According to another embodiment, a method for introducing a reducing agent by means of a metering device into an exhaust gas system of an internal-combustion engine with a storage tank for storing the reducing agent, a supply pipe which connects the storage tank to a metering unit associated with the exhaust gas system, the unit introducing the reducing agent into the exhaust gas system, an electrical pump mechanism used in the supply pipe for conveying the reducing agent, a pressure-releasing device which comprises a return pipe connected to the storage tank and coming off at a branch of the supply pipe downstream of the pump mechanism, and a first valve system arranged in the return pipe, wherein the method may comprise: during operation of the metering device when the valve of the first valve system is closed, detecting values for the electrical current consumed by the pump mechanism by means of a current detector and continually comparing these values with a predefined threshold value, and if the threshold value is fallen below, closing a valve of a second valve assembly arranged in the supply pipe downstream of the branch, so air present in the supply pipe upstream of the second valve system collects in a section of the return pipe serving as a storage volume.

According to a further embodiment of one of the above methods, when the second valve system is closed, pressurized reducing agent can be at least intermittently supplied to the metering unit from the section of the supply pipe located downstream of the second valve system and serving as the storage volume. According to a further embodiment of one of the above methods, after a predetermined period the valve of the first valve system can be opened, so the air that has collected in the pipe section flows back into the storage tank via the return pipe. According to a further embodiment of one of the above methods, the valve of the second valve system can be closed when the internal-combustion engine is stopped.

BRIEF DESCRIPTION OF THE DRAWINGS

An exemplary embodiment will be described in more detail below with reference to a schematic drawing.

FIG. 1 shows in the form of a block diagram a metering device for a liquid reducing agent for exhaust gas after-treatment in an internal-combustion engine, only the components necessary for an understanding of the invention being shown.

DETAILED DESCRIPTION

According to various embodiments, a metering device for introducing a reducing agent into an exhaust gas system of an internal-combustion engine, may comprise: a storage tank for storing the reducing agent, a supply pipe which connects the storage tank to a metering unit associated with the exhaust gas system, the unit introducing the reducing agent into the exhaust gas system, a pump mechanism used in the supply pipe for conveying the reducing agent, a pressure sensor device for detecting the pressure in the supply pipe downstream of the pump mechanism, and a pressure-releasing device which comprises a return pipe connected to the storage tank and coming off at a branch of the supply pipe downstream of the pump mechanism, and a first valve system arranged in the return pipe. In physical terms, the section of the supply pipe located between branch and entry of the first valve system is located at a higher level than the return pipe, so a storage volume for air present in the supply pipe is formed.

According to an embodiment, a second valve system can be arranged in the supply pipe downstream of the branch, the pipe branch of the supply pipe between branch and entry of the second valve system being shorter than the pipe branch of the supply pipe between the exit of the second valve system and the metering device.

On the one hand this kind of constructional development of the metering device ensures that by activating the pressure-reducing device excess pressure, for example as a result of freezing of the liquid reducing agent or in the event of very high temperatures, can be reliably avoided in the metering device, and on the other hand it allows use of an inexpensive pump mechanism as it only has to convey the reducing agent in one direction.

Furthermore, the metering device according to various embodiments ensures that the pump mechanism can also suck in air bubbles instead of liquid reducing agent without the efficiency of the exhaust gas treatment being impaired in the process. Continuous operation of the exhaust gas after-treatment is also ensured up to the instant at which the air bubbles are returned from the supply system into the storage tank again and pure reducing agent is being conveyed again.

The reducing agent required for this is located in the pipe section of the supply pipe, serving as reducing agent reservoir, between the closed second valve system and the metering unit. As this pipe section is relatively long there is sufficient reducing agent in it to bridge the period until the pump mechanism conveys reducing agent again.

The pressure resistance of the metering device can be increased further by shutting off this second valve system when the internal-combustion engine is stopped. The formation of ice in the reducing agent that occurs at low temperatures, which, as a rule, has its starting point at the metering unit and leads to a column of ice that forms inside the pipe section in the direction of the second valve system, cannot cause any damage to the sensitive components of the system (pump mechanism, pressure sensor) owing to the closed second valve system.

A first method according to various embodiments for introducing a reducing agent into an exhaust gas system of an internal-combustion engine uses a metering device, which comprises the following: a storage tank for storing the reducing agent, a supply pipe which connects the storage tank to a metering unit associated with the exhaust gas system, the unit introducing the reducing agent into the exhaust gas system, a pump mechanism used in the supply pipe for conveying the reducing agent, a pressure sensor device for detecting the pressure in the supply pipe downstream of the pump mechanism, a pressure-releasing device which comprises a return pipe connected to the storage tank and coming off at a branch of the supply pipe downstream of the pump mechanism, and a first valve system arranged in the return pipe.

According to the method, during operation of the metering device when the valve of the first valve system is closed, the values of the pressure detected by the pressure sensor device are continually compared with a predefined threshold value and if the threshold value is fallen below, the valve of a second valve assembly arranged in the supply pipe downstream of the branch is closed, so air present in the supply pipe upstream of the second valve system collects in a section of the return pipe serving as a storage volume.

A second method according to various embodiments for introducing a reducing agent into an exhaust gas system of an internal-combustion engine uses a metering device, which comprises the following: a storage tank for storing the reducing agent, a supply pipe which connects the storage tank to a metering unit associated with the exhaust gas system, the unit introducing the reducing agent into the exhaust gas system, an electrical pump mechanism used in the supply pipe for conveying the reducing agent, a pressure-releasing device which comprises a return pipe connected to the storage tank and coming off at a branch of the supply pipe downstream of the pump mechanism, and a first valve system arranged in the return pipe.

According to the method, during operation of the metering device when the valve of the first valve system is closed values for the electrical current consumed by the pump mechanism are detected by means of a current detector and these values are continually compared with a predefined threshold value and if the threshold value is fallen below, the valve of a second valve assembly arranged in the supply pipe downstream of the branch is closed, so air present in the supply pipe upstream of the second valve system is collected in a section of the return pipe serving as a storage volume.

The metering device 10 comprises a storage tank 12, provided with a filling pipe 13, for a liquid reducing agent 14. An ammonia precursor, preferably a urea-water solution, is used as reducing agent 14 in what is known as an SCR (selective catalytic reduction) exhaust gas purification process. The reducing agent 14 is removed from the storage tank 12 via a tank discharging tube 27 to which, outside of the storage tank 12, a first fluid pipe, hereinafter called the supply pipe 15, is connected and which leads through to a metering unit 16. The metering unit 16 is arranged, for example, on an exhaust gas system 17 of an internal-combustion engine of a motor vehicle (not shown) to meter the reducing agent 14 into the exhaust gas system 17, for example into the exhaust gas intake region of an exhaust gas catalytic converter 18. Alternatively the reducing agent 14 can be injected by means of the metering unit 16 directly into a mixing chamber connected upstream of the exhaust gas catalytic converter, or into a hydrolysis catalytic converter, instead of directly into the exhaust gas system 17. The reducing agent 14 causes the toxic nitrogen oxides in the exhaust gas to be converted into nitrogen and water. An electrically controllable valve, for example a conventional fuel injection valve for intake manifold injection, is preferably used as the metering unit 16. As the least expensive variant the metering unit 16 can also be constructed as a simple nozzle.

A filter element 19 is provided in the supply pipe 15 in the vicinity of the removal point for the reducing agent 14, and downstream thereof a pump mechanism 20. The filter element 19 is used for example to filter solid particles or crystals caused by drying, which are present in the reducing agent 14, to prevent the pump mechanism 20 and metering unit 16 from becoming blocked up. The filter element 19 can also be arranged inside the storage tank 12. The pump mechanism 20 conveys the reducing agent 13 in one direction, i.e. from the storage tank 12 via the supply pipe 15, 15', 15" to the metering unit 16.

Alternatively a pump mechanism 20 may also be provided which is capable of conveying not just in one direction, but in two directions, i.e. such that the reducing agent 14 may also be pumped back into the storage tank 12 again. A diaphragm pump for example may be used as the pump mechanism 20, the diaphragm of which is preferably electrically driven. Alternatively the diaphragm may also be driven mechanically or hydraulically.

A pressure sensor device 21, which detects the pressure in the supply pipe 15 downstream of the pump mechanism 20, is arranged in the section of the supply pipe 15 which leads from the pressure side of the pump mechanism 20 to the second valve system 22. At least one pressure sensor may be provided for this purpose. At least one temperature sensor may also optionally be provided which, for example, measures the temperature in the supply pipe 15, the temperature at or in the storage tank 12 and/or an ambient temperature. It may thus be determined whether, for example, freezing of the reducing agent 14 need be a concern. Commercially available, aqueous urea solution with 32.5% urea content has a freezing point of −11° Celsius. When it freezes the aqueous urea solution expands by about 10%, so the pressure in the components of the metering device 10 filled with reducing agent increases.

To counteract this increase in pressure a pressure-releasing device 24 with a second fluid pipe, hereinafter called the return pipe 25, with a first electrically controllable valve system 23 arranged therein, is provided. A branch 28 is provided for this purpose in the section of the supply pipe 15 downstream of the pressure sensor device 21 and upstream of the second valve system 22, to which branch the return pipe 25 is connected and leads back to the storage tank 12. The first valve system 23 is inserted in the return pipe 25 at a point that does not lie immediately downstream of the branch 28 but at a point which, relative to the level of the supply pipe 15, is located at a higher level, so a certain storage volume is formed between branch 28 and entry to the first valve system 23 through the pipe section 25 that therefore exists. The importance of the storage volume will be described later.

The first valve system 23 can, for example, comprise at least one 2/2-way valve or another suitable valve, and in particular a conventional fuel injection valve for intake manifold injection may be used.

A second electrically controllable valve system 22, with the aid of which the flow of reducing agent 14 to the metering unit 16 can be activated or stopped, is arranged in the section of the supply pipe 15 which leads from the pressure side of the pump mechanism 20 to the metering unit 16. Spatially the second valve system 22 is not arranged in the supply pipe 15 immediately before the metering valve 16 but at a distance therefrom, so a pipe section 15" remains between the exit of the second valve system 22 and the metering valve 16, the purpose of which will be described later. The second valve system 22 can, for example, comprise at least one 2/2-way valve or another suitable valve. In particular a conventional fuel injection valve for intake manifold injection may be used.

As illustrated further in the FIGURE, said controllable valve systems 22, 23, pump mechanism 20, pressure sensor device 21 and metering unit 16 are electrically connected to a controller 26. This also applies to further sensors, not explicitly shown in the FIGURE, such as a level sensor in or on the storage tank 12 for the reducing agent 14, or exhaust gas sensors and temperature sensors upstream and downstream of the exhaust gas catalytic converter 18. A current detector 29 is provided for detecting the electrical current of the pump mechanism 20. The controller 26 processes the data obtained from the sensors and controls various actuators, inter alia the pump mechanism 20, and the valve systems 22, 23, so the reducing agent 14 can be metered to the exhaust gas as needed. Control functions for controlling and regulating the exhaust gas after-treatment are implemented in terms of software in a program memory 30 in the controller 26. A memory 31, in which various threshold values SW1 are stored, is also provided in the controller 26.

The controller 26 can be a control device that is specially provided for the exhaust gas after-treatment and to which all signals required for exhaust gas after-treatment are directly supplied, or the controller 26 is connected by a interface, for example via a CAN bus, to a control device that is used to control and regulate the internal-combustion engine. In the former case the metering device 10 and the controller 26 are preferably suitable for retrofitting in existing internal-combustion engine exhaust gas systems.

The function of the controller 26 may also be partially or completely integrated in the control device of the internal-combustion engine.

The function of the metering device, in particular the function and interaction of the two valve systems 22, 23, will be described in more detail below.

If, for example, in winter the aqueous urea solution starts to freeze, the urea solution expands in the supply pipe 15 and if it continues to freeze can damage the pipe and components connected to it, in particular the pump mechanism 20 and the pressure sensor device 21. To release the pressure that is produced during the phase transition the first valve system 23 is accordingly opened, whereby some of the reducing agent 14 is conveyed back into the storage tank 12. This has the advantage that destruction of the components of the metering device 10 can be prevented if a frost occurs.

What is known as circular pumping of the reducing agent 14 is also possible during thawing. This means that pumped-out liquid reducing agent 14 can be pumped back into the storage tank 12 and in turn brings about thawing of further reducing agent 14 therein. The thawing time can be reduced as a result.

One function of the pressure-releasing device 24, comprising return pipe 25 and first valve system 23, therefore consists generally in bringing about a reduction in pressure if the pressure sensor and/or temperature sensor device 21 determines that the pressure, at least in the supply pipe 15, is threatening to become too high. A special pump mechanism with which the reducing agent 14 is pumped back into the storage tank 12 can be dispensed with in this case. A pump mechanism 20 which accordingly only pumps in one direction, i.e. from the storage tank 12 to the metering unit 20, is sufficient.

The resistance of the metering device 10 to ice may also be significantly improved by using the second valve system 22 in section 15' of the supply pipe 15. The freezing process of the aqueous urea solution used as reducing agent usually begins with the metering unit 16 and the resulting column of ice grows along the pipe section 15" in the direction of the pump mechanism 20 and toward the pressure sensor device 21. Even if pipe section 15" is constructed as a flexible hose, there is the risk of said components being destroyed as a result of the increase in the volume of the urea solution when it freezes. Therefore when a vehicle fitted with such a metering device for exhaust gas after-treatment of an internal-combustion engine is stopped, the valve of the second valve system 22 is closed, so the ice pressure that occurs can be absorbed by the second valve system 22 without incurring damage and the remaining components of the metering device 10, in particular the pump mechanism 20 and the pressure sensor device 21, are effectively protected.

The use of the first valve system 23 and the return pipe 25 is not limited to the described cases of pressure reduction and prevention of freezing and easier thawing of the reducing agent 14.

Owing to the limited available installation space the storage tanks used for storing the reducing agent can often only be constructed as relatively flat containers in motor vehicles, i.e. storage tanks which, based on the extent of their length and breadth, have only a low height. Such storage tanks for the reducing agent are in particular frequently accommodated in the spare wheel well. However, with such flat storage tanks there is the risk, owing to the reducing agent sloshing around, in particular when driving over rough roads or in the event of sharp acceleration or braking operations, of the tank discharging tube no longer immersing fully into the reducing agent, and the pump mechanism sucking in some air, or only air, to convey the reducing agent.

Consequently air bubbles pass into the pump mechanism 20, and, in particular when using a diaphragm pump, the reducing agent can then no longer be conveyed in a sufficient volume or, if the pump space is completely filled with air, can no longer be conveyed at all.

During operation of the metering device 10, the valve of the second valve system 22 is open and the valve of the first valve system 23 closed. In the process the pressure p in the supply pipe 15 downstream of the pump mechanism 20 is constantly monitored by means of the pressure sensor device 21. If the pump mechanism 20 is only conveying compressible air instead of the incompressible, liquid reducing agent, the pressure p drops and this drop in pressure p is evaluated by the controller 26. If it reaches a predefined threshold SW1, which is stored in the memory 31 of the controller 26, the valve of the second valve system 22 is activated by means of the electrical signal from the controller 26 in such a way that the inflow from the pump mechanism 20 to the metering unit 16 is interrupted. The pipe section 15" between the exit of the now closed second valve system 22 and the metering unit 16 constitutes a pressurized reservoir for the reducing agent 14, so, if required, reducing agent 14 can continue to be introduced into the exhaust gas system 17 by means of the metering unit 16. In the meantime the air conducted by the pump mechanism 20 collects in the storage volume which is formed by the pipe section 25', starting from the branch 28 up to the entry of the first valve system 23. Since, as already mentioned, the first valve system 23 is located at a physically higher level, relative to the supply pipe 15, and air is lighter than the liquid reducing agent 14, the air bubbles rise in the direction of the entry side of the first valve system 23 and collect there in section 25' of the supply pipe 25 while the reducing agent 14 remains in the supply pipe 15 located at a lower level.

After a predefined period the valve of the first valve system 23 is activated by means of an electrical signal in such a way that, via the return pipe 25, a flow communication is accordingly produced between pipe section 25', serving as a storage volume for the air bubbles, and the storage tank 12. As a result the air in pipe section 25' can flow back into the storage tank 12. The period after which the first valve system 23 activates the return pipe 25 is preferably experimentally determined by way of tests and depends inter alia on the geometries of the supply pipe 15, the pipe section 25' and therefore the size of the storage volume 29 and the output of the pump mechanism 20. While the valve of the first valve system 23 is open the pressure p in the supply pipe 15 is constantly monitored by means of the pressure sensor device 21. If the pressure p exceeds a predetermined threshold SW2 it is determined that the pump mechanism 20 can build up pressure again and the valve of the first valve system 23 closes the cross-section of the first valve system 23 while the valve of the second valve system 22 activates the flow of reducing agent 14 through to the metering unit 16 again.

If the pressure measurement shows that the threshold SW2 could not be reached, the return pipe 25 is closed again with the aid of the first valve system 23 and after a predefined period has expired it is again checked whether pressure is potentially building up.

Alternatively, conveying of reducing agent 14 again, instead of conveying of air, may also be determined by detecting and evaluating the electrical current consumed by the pump mechanism 20 by means of a current detector 29 as the level of electrical current consumed when conveying liquid reducing agent differs significantly from the level of electrical current consumed when conveying compressible air. The current consumption is less when conveying air than when conveying liquid. The temporal course of the drive current can also be evaluated when using a diaphragm pump with a magnetic drive as the pump mechanism 20.

The invention has been described with reference to an example in which the individual components of the metering device 10 are shown as separate elements for reasons of clarity. However, it is also possible for a plurality of the described components to be combined to form a single or several module(s), in particular to integrate the filter 19, pump mechanism 20, pressure sensor device 21 and valve systems 22, 23 on a common carrier plate.

What is claimed is:

1. A system for introducing a reducing agent into an exhaust gas stream of an internal-combustion engine, the system comprising:
    a storage tank for storing the reducing agent,
    a pump in fluid communication with the storage tank operable to draw the reducing agent from the storage tank and deliver it to a supply pipe,
    a metering valve dispensing the reducing agent directly into the exhaust gas stream from the supply pipe,
    a pressure sensor for detecting the pressure in the supply pipe downstream of the pump,
    a temperature sensor measuring a temperature at a point in the system,
    a return pipe having two ends, one end connected to the top of the storage tank and the other end coming off at a branch of the supply pipe downstream of the pump and upstream of the metering valve,
    a first electrically controllable valve arranged in the return pipe,
    wherein a section of the return pipe located between the branch and entry of the first electrically controllable valve is located at a higher level than the supply pipe, thereby forming a storage volume for air present in the supply pipe, and
    a second electrically controllable valve arranged in the supply pipe downstream of the branch and upstream of the metering valve, the section of the supply pipe which is located between the branch and entry of the second electrically controllable valve being shorter than the section of the supply pipe between the exit of the second electrically controllable valve and the metering valve, and
    a controller configured to:
    in response to detecting a temperature below a predefined temperature threshold, automatically open the first electrically controllable valve and close the second electrically controllable valve if the internal-combustion engine is shut off and maintain said opening and closing of the first and second electrically controllable valves to provide circular pumping of the reducing agent through the storage tank until the detected temperature exceeds the predefined temperature threshold,
    in response to detecting a pressure below a predefined minimum pressure threshold value, automatically close the second electrically controllable valve and open the first electrically controllable valve and the metering valve, such that with the second electrically controllable valve closed by the controller and the first electrically controllable valve and the metering valve are opened by the controller:
        (a) air present in the supply pipe upstream of the second electrically controllable valve vents into the top of the storage tank via the open first electrically controllable valve and the return line, and
        (b) the metering valve injects a volume of reducing agent present in the section of the supply pipe between the exit of the second electrically controllable valve and the metering valve.

2. The system according to claim 1, wherein the reducing agent comprises a urea solution or an ammonia solution.

3. The system according to claim 1, wherein the pump comprises a diaphragm pump.

4. The system according to claim 1, further comprising a filter configured to remove impurities from the reducing agent disposed in the supply pipe.

5. A method for introducing a reducing agent into an exhaust gas stream of an internal-combustion engine with a storage tank for storing the reducing agent, a pump in fluid communication with the storage tank operable to draw the reducing agent from the storage tank and deliver it to a supply pipe, a metering valve dispensing the reducing agent directly into the exhaust gas stream from the supply pipe, a pressure sensor for detecting the pressure in the supply pipe downstream of the pump, a return pipe connected to the top of the storage tank and coming off at a branch of the supply pipe downstream of the pump and upstream of the metering valve, and a first electrically controllable valve arranged in the return pipe, the method comprising:
    closing the first electrically controllable valve,
    injecting the reducing agent into the exhaust stream while the first electrically controllable valve restricts flow into the return pipe connected back to the top of the storage tank, continually comparing pressure values detected by the pressure sensor with a predefined minimum pressure threshold value, detecting one or more pressure values that fall below the predefined minimum pressure threshold value, detecting a temperature of the reducing agent at a point in the system, and in response to detecting one or more pressure values that fall below the predefined minimum pressure threshold value:

automatically closing a second electrically controllable valve arranged in the supply pipe downstream of the branch and upstream of the metering valve, thereby causing air present in the supply pipe upstream of the second electrically controllable valve to collect in a section of the return pipe between the branch and entry of the first electrically controllable valve and located at a higher level than the supply pipe, the section serving as a storage volume, and with the second electrically controllable valve closed, controlling the metering valve to inject a volume of reducing agent present in a section of the supply pipe between an exit of the second electrically controllable valve and the metering valve, and in response to the detected temperature below a predefined temperature threshold, automatically opening the first electrically controllable valve and closing the second electrically controllable valve if the internal-combustion engine is shut off and maintaining said opening and closing of the first and second electrically controllable valves to provide circular pumping of the reducing agent through the storage tank until the detected temperature exceeds the predefined temperature threshold.

6. The method according to claim 5, further comprising, after closing of the second electrically controllable valve, supplying pressurized reducing agent at least intermittently to the metering valve from the section of the supply pipe located downstream of the second electrically controllable valve and serving as the storage volume.

7. The method according to claim 6, further comprising, after closing of the second electrically controllable valve for after a predetermined period opening of the first electrically controllable valve, thereby causing the air that has collected in the pipe section to flow back into the storage tank via the return pipe.

8. A method for introducing a reducing agent into an exhaust gas stream of an internal-combustion engine with a storage tank for storing the reducing agent, an electrical pump in fluid communication with the storage tank operable to draw the reducing agent from the storage tank and deliver it to a supply pipe, a metering valve injecting the reducing agent directly into the exhaust gas stream from the supply pipe, a return pipe connected to the top of the storage tank and coming off at a branch of the supply pipe downstream of the electrical pump and upstream of the metering valve, and a first electrically controllable valve arranged in the return pipe, the method comprising:

closing the first electrically controllable valve, injecting the reducing agent into the exhaust stream while the first electrically controllable valve restricts flow into the return pipe connected back to the top of the storage tank, detecting values of an electrical current consumed by the pump using a current detector and continually comparing the detected electrical current values with a predefined minimum current threshold value, detecting one or more electrical current values that fall below the predefined minimum current threshold value, detecting a temperature of the reducing agent at a point in the system, and in response to detecting one or more electrical current values that fall below the predefined minimum current threshold value:

automatically closing a second electrically controllable valve arranged in the supply pipe downstream of the branch and upstream of the metering valve, thereby causing air present in the supply pipe upstream of the second electrically controllable valve to collect in a section of the return pipe located between the branch and entry of the first electrically controllable valve and at a higher level than the supply pipe, the section serving as a storage volume, and with the second electrically controllable valve closed, controlling the metering valve to inject a volume of reducing agent present in a section of the supply pipe between an exit of the second electrically controllable valve and the metering valve, and in response to the detected temperature below a predefined temperature threshold, automatically opening the first electrically controllable valve and closing the second electrically controllable valve if the internal-combustion engine is shut off and maintaining said opening and closing of the first and second electrically controllable valves to provide circular pumping of the reducing agent through the storage tank until the detected temperature exceeds the predefined temperature threshold.

9. The method according to claim 8, further comprising, after closing of the second electrically controllable valve, supplying pressurized reducing agent at least intermittently to the metering valve from the section of the supply pipe located downstream of the second electrically controllable valve and serving as the storage volume.

10. The method according to claim 8, further comprising, after closing of the second electrically controllable valve for after a predetermined period opening the valve of the first electrically controllable valve, thereby causing the air that has collected in the pipe section to flow back into the storage tank via the return pipe.

* * * * *